(12) United States Patent
Liu et al.

(10) Patent No.: US 7,140,261 B2
(45) Date of Patent: Nov. 28, 2006

(54) ACOUSTIC WAVE FLOW SENSOR

(75) Inventors: James Z T Liu, Belvidere, IL (US); Aziz Rahman, Sharon, MA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/116,496

(22) Filed: Apr. 27, 2005

(65) Prior Publication Data
US 2006/0243064 A1   Nov. 2, 2006

(51) Int. Cl.
*G01F 1/66* (2006.01)
(52) U.S. Cl. .................................. 73/861.25
(58) Field of Classification Search ............ 73/204.11, 73/204.23, 204.15, 204.26, 587, 702
See application file for complete search history.

(56) References Cited

U.S. PATENT DOCUMENTS

| | | | |
|---|---|---|---|
| 3,978,731 A * | 9/1976 | Reeder et al. ................ 73/703 |
| 4,348,906 A | 9/1982 | Feller ....................... 73/861.77 |
| 4,462,264 A | 7/1984 | Feller ....................... 73/861.18 |
| 4,590,805 A | 5/1986 | Baird et al. ................ 73/861.87 |
| 4,616,509 A | 10/1986 | Feller ....................... 73/861.05 |
| 4,790,195 A | 12/1988 | Feller ....................... 73/861.77 |
| 4,932,255 A * | 6/1990 | Brace et al. ................ 73/204.11 |
| 5,003,822 A * | 4/1991 | Joshi ........................ 73/204.23 |
| 5,235,235 A | 8/1993 | Martin et al. ............ 310/313 D |
| 5,545,007 A | 8/1996 | Martin ..................... 415/173.2 |
| 5,869,763 A | 2/1999 | Vig et al. ....................... 73/580 |
| 6,044,332 A | 3/2000 | Korsah et al. ................ 702/76 |
| 6,420,815 B1 | 7/2002 | Tanaka et al. ........... 310/313 A |
| 6,435,040 B1 | 8/2002 | Feller ....................... 73/861.71 |
| 6,696,736 B1 * | 2/2004 | Inoue et al. ................ 257/416 |
| 6,810,750 B1 * | 11/2004 | Kiefer et al. ................. 73/801 |
| 6,870,302 B1 | 3/2005 | Nakamura et al. ...... 310/313 B |
| 2005/0059357 A1 | 3/2005 | Edmonson et al. ........... 455/74 |

* cited by examiner

*Primary Examiner*—Jewel Thompson
(74) *Attorney, Agent, or Firm*—Kermit D. Lopez; William B. Shelby

(57) ABSTRACT

An acoustic wave flow sensor is disclosed, which includes a sensor substrate and an acoustic wave diaphragm etched upon the sensor substrate, wherein mechanical stress or strain is concentrated in the acoustic wave diaphragm. One or more interdigital transducers can be configured upon the acoustic wave diaphragm, wherein the sensor substrate, the acoustic wave diaphragm and the interdigital transducer(s) form an acoustic wave flow sensor, such that when the interdigital transducer and the acoustic wave diaphragm are exposed to a fluid in flow, the fluid in flow causes the acoustic wave diaphragm to experience a change in the mechanical stress or strain resulting in a detectable frequency and/or phase change in order to provide an indication of fluid flow.

21 Claims, 2 Drawing Sheets

ACOUSTIC WAVE FLOW SENSOR

TECHNICAL FIELD

Embodiments are generally related to flow sensing devices and techniques. Embodiments are also related to acoustic wave devices, such as, for example, surface acoustic wave (SAW) and bulk acoustic wave (BAW) devices.

BACKGROUND OF THE INVENTION

Flow sensors are utilized in a variety of fluid-sensing applications for detecting the quality of fluids, including gas and liquid. Flow sensors for such fluids, which detect the fluid flow or property of fluid, can be implemented, for example, as sensors on silicon in microstructure form. For convenience sake, and without limitation, the term "flow sensor" not only can refer to the flow of a fluid (including both gas and liquids), but can also be implemented in the context of thermal sensors. The reader will appreciate that such sensors may be also utilized to measure primary properties such as temperature, thermal conductivity, specific heat and other properties; and that the flows may be generated through forced or natural convection.

A fluid or thermal-type flow sensor typically includes a substrate that includes a heating element and a proximate heat-receiving element or two. If two such sensing elements are used, they are preferably positioned at upstream and downstream sides of the heating element relative to the direction of the fluid (liquid or gas) flow to be measured. When fluid flows along the substrate, it is heated by the heating element at the upstream side and the heat is then transferred non-symmetrically to the heat-receiving elements on either side of the heating element. Since the level of non-symmetry depends on the rate of gas flow and that non-symmetry can be sensed electronically, such a flow sensor can be used to determine the rate and the cumulative amount of the fluid flow.

Such flow sensors generally face potential degradation problems when exposed to harsh (contaminated, dirty, condensing, etc.) fluids, including gases or liquids that can "stress" the sensor via corrosion, radioactive or bacterial contamination, overheating, or freeze-ups. The sensitive measurement of the flow, or pressure (differential or absolute) of "harsh" gases or liquids that can stress corrode, freeze-up, or overheat the sensing elements is a challenge that is either unmet or met at great expense.

Among the solutions proposed previously are passivation with the associated desensitization of the sensor, heaters to avoid condensation or freeze-ups (or coolers to prevent overheating) at the expense of sensor signal degradation, cost increase and possible fluid degradation, or filters to remove objectionable particulate matter. Frequent cleaning or replacement of the sensors is an additional, but costly, solution. Sensitive, membrane-based differential pressure sensors can be protected against contamination because no flow is involved, but they are much less sensitive and much more expensive than thermal micro-sensors, in addition to not being overpressure proof.

Another problem with fluid or thermal flow sensors, particularly, micro-bridge thermal flow sensors, it that such devices possess a relative small dynamic range. A micro-bridge thermal flow sensor, for example, typically incorporates a heater that consumes a great deal of power. It is therefore difficult to adapt such devices for passive wireless applications. An additional problem with thermal flow sensors is that heating may introduce unwanted chemical compositional change or damage the fluid (e.g., blood), particularly in medical applications.

It is believed that one possible solution for the problems inherent with flow sensors is the use of acoustic wave devices, such as, for example, surface acoustic wave sensor. Examples of acoustic wave sensors include devices such as surface acoustic wave sensors, which can be utilized to detect the presence of substances, such as chemicals. An acoustic wave (e.g., SAW/BAW) device acting as a sensor can provide a highly sensitive detection mechanism due to the high sensitivity to surface loading and the low noise, which results from their intrinsic high Q factor.

Surface acoustic wave (SAW) devices are typically fabricated using photolithographic techniques with comb-like interdigital transducers (IDTs) placed on a piezoelectric material. A SAW device relies on the use of waves that propagate at the surface of a piezoelectric substrate, such that the displacement amplitudes of such waves experience an exponential decay beneath the surface. A SAW sensor can be fabricated on a very thin diaphragm. The theoretical inherent strengths of elastic materials are generally orders of magnitude greater than the measured strengths of the ordinary forms of these materials. This reduction in strength is known to be caused principally by surface flaws, such as scratches, which concentrate the applied stress and thereby lead to fracture at loads which are much lower than the theoretical maximum.

Etching has been used in BAW device manufacturing for many years, such as inverted mesa type high frequency fundamental crystal resonators. Etching was introduced in SAW sensor manufacturing to etch off the backside of the sensor. Etching in a wet chemical process has been shown to be capable of chemically polishing quartz over a broad range of conditions. The etching process can remove a large amount of materials from lapped blanks while simultaneously producing an improved surface finish, without producing shifts in the angles of cut. This process can also produce SAW dies with greater strength, which is particularly important for many sensing applications.

Etching does not introduce defects, but etching does reveal defects. Swept quartz is needed for micro-machined SAW sensors. A swept quartz wafer is usually free of etch channels. Etch channels are a consequence of dislocations at which impurities are segregated. Swept quartz also has fewer etch pits compared to non-swept quartz. SAW sensors can also be constructed using double side polished wafers. For example, a polished device may possess a mechanical strength increased by 10 times. This is critical in overpressure proofing. Because the backside of the SAW wafer is to be etched, the surface condition is critical in the etch surface finish. The quality of an etched surface finish primarily depends on the surface prior to etching, the depth of etch, etchants selection, speed of etching and the quality of quartz utilized.

Surface acoustic wave devices may have either a delay line or a resonator configuration. The change of the acoustic property due to measurand can be interpreted as a delay time shift for the delay line surface acoustic wave device (SAW-DL) or a frequency shift for the resonator (BAW/SAW-R) acoustic wave device.

Acoustic wave sensing devices often rely on the use of quartz crystal resonator components, such as the type adapted for use with electronic oscillators. Acoustic wave devices are attractive to fluid flow applications because of their high sensitivity, resolution and ruggedness. The detection mechanism implemented depends on changes in the acousto-elastic properties of the piezoelectric crystal when exposed to a gas or fluid. Wired measurement results are usually obtained as the output frequency of a loop oscillator circuit, which utilizes the acoustic wave device as the feedback element.

In general, existing SAW flow sensor concepts are based on the same thermal mass flow theory that applies to micro-bridge thermal flow type sensors, which measures the displacement of the temperature profile caused by the flow around a heater. One of the problems with existing SAW flow sensor designs is that such configurations incorporate two or more SAW temperatures sensors along with a heater. Such a design increases the sensor size and raises the production cost and power usage thereof. Additionally, the use of a heating element introduces accelerated aging for any IDT electrodes and associated SAW sensing components.

There are two other techniques for measuring flow rate using an acoustic wave sensor. One is to measure the flow-induced shear stress. This kind of acoustic wave sensor could have a textured surface. The textured surface helps to increase the shear stress induced by flow. The other technique involves measuring the pressure difference between two points by applying Bernoulli's law.

Shear stress is a flow-induced force exerted on the wall of the flow tube. This force relies upon units of force per unit square area. The flow rate can be calculated from the following relationship: $Q=\tau/6\mu$, where Q is the fluid flow rate (m3/sec), $\tau$ is the shear stress (N/m2), $\mu$ is the fluid viscosity (Nm/s2), and A is related to the geometry of the tube.

The magnitude of the fluid flow rate is linearly dependent on the shear stress. Since the fluid viscosity and density are temperature dependent, changes in temperature affect the shear stress, hence the flow rate measurement. The effect of temperature on density is usually small, and when temperature increases, the fluid viscosity usually increases, so the shear force usually decreases. Based on the foregoing, it is desirable to implement an acoustic wave temperature sensor on the same sensor die of an acoustic wave flow sensor.

BRIEF SUMMARY OF THE INVENTION

The following summary of the invention is provided to facilitate an understanding of some of the innovative features unique to the embodiments and is not intended to be a full description. A full appreciation of the various aspects of the embodiments can be gained by taking the entire specification, claims, drawings, and abstract as a whole.

It is, therefore, one aspect of the present invention to provide for an improved flow sensor.

It is another aspect of the present invention to provide for a flow sensor that incorporates interdigital surface wave components.

The aforementioned aspects of the invention and other objectives and advantages can now be achieved as described herein. An acoustic wave flow sensor is disclosed, which includes a sensor substrate and an acoustic wave diaphragm etched upon the sensor substrate, wherein mechanical stress or strain is concentrated in the acoustic wave diaphragm. One or more interdigital transducers can be configured upon the acoustic wave diaphragm, wherein the sensor substrate, the acoustic wave diaphragm and the interdigital transducer (s) form an acoustic wave flow sensor, such that when the interdigital transducer and the acoustic wave diaphragm are exposed to a fluid in flow, the fluid in flow causes the acoustic wave diaphragm to experience a change in the mechanical stress or strain resulting in a detectable frequency change in order to provide an indication of the fluid in flow. Additionally, the fluid in flow causes the acoustic wave diaphragm to experience a change in the mechanical stress or strain resulting in a detectable phase change in order to provide an indication of the fluid in flow.

A new fluid flow sensor design is thus disclosed, which is based on the measurement of flow induced stress on the surface acoustic wave (SAW) device, which can be realized with one SAW sensor on each sensor die or chip. In such a SAW fluid flow sensor, mechanical stress/strain affects both the propagation path length and wave velocity. Thus, changes in frequency and/or phase correlate with the strain and/or stress. The strain/stress is concentrated in the etched SAW diaphragm, so that the resulting etched SAW chip possesses a high strain/stress sensitivity for the detection of fluid flow.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles embodied therein.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
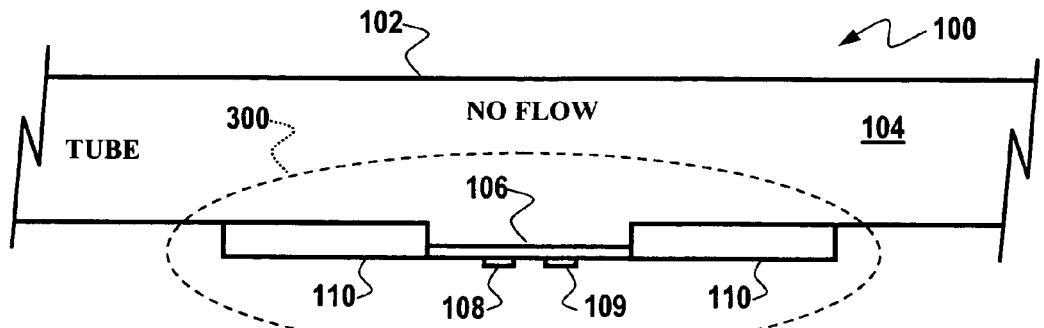
FIG. 1 illustrates a side view of a flow sensor system that includes a SAW etched diagram not under stress, in accordance with a preferred embodiment.
Figure 2:
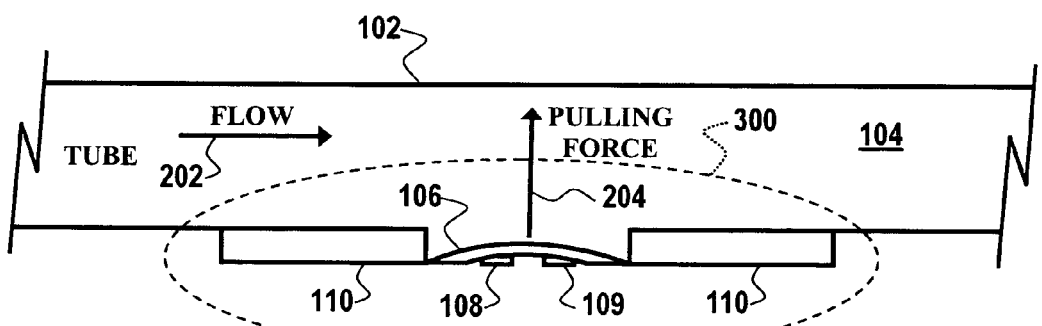
FIG. 2 illustrates a side view of the flow sensor system depicted in FIG. 1 with the SAW etched diagram under stress, in accordance with a preferred embodiment.
Figure 3:
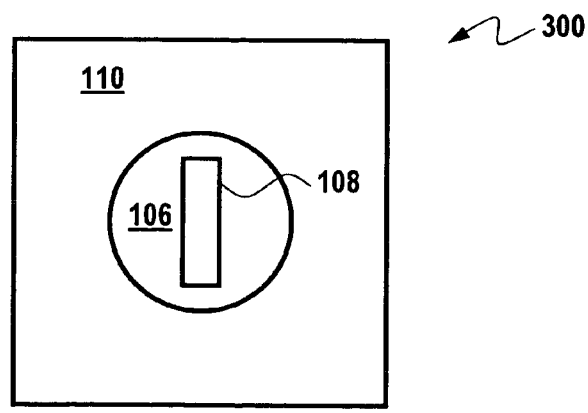
FIG. 3 illustrates a top view of a SAW sensor with the SAW etched diagram depicted in FIGS. 1–2, in accordance with a preferred embodiment.

FIG. 1 illustrates a side view of a flow sensor system 100 that includes a SAW etched diaphragm 106 not under stress, in accordance with a preferred embodiment. FIG. 2 illustrates a side view of the flow sensor system 100 depicted in FIG. 1 with the SAW etched diaphragm 106 under stress, in accordance with a preferred embodiment. FIG. 3 illustrates a top view of a SAW sensor 300 with the SAW etched diaphragm 106 depicted in FIGS. 1–2, in accordance with a preferred embodiment. Note that in FIGS. 1–3, identical or similar parts or elements are generally indicated by identical reference numerals.

In the configuration of FIG. 1, system 100 is depicted with a tube 102 having a central portion 104 thereof, wherein fluid is not present or not flowing within tube 102. A SAW sensor 300 is also depicted in FIG. 1 as connected or incorporated with tube 102. In general, SAW sensor 300, which is indicated by dashed lines in FIG. 1, includes one or more SAW interdigital transducers (IDTs) 108, 109 configured upon a SAW die 110 above the SAW etched diaphragm 106. SAW die 110 and etched diaphragm 106 are formed parallel to the main axis of tube 102. SAW die 110 can be formed, for example, as a piezoelectric substrate.

A variety of substrate materials may be utilized to form such the piezoelectric substrate (i.e., SAW die 110). For example quartz, lithium niobate ($LiNbO_3$), lithium tantalite ($LiTaO_3$), $Li_2B_4O_7$, $GaPO_4$, langasite ($La_3Ga_5SiO_{14}$), ZnO, and/or epitaxially grown nitrides such as Al, Ga or Ln, to name a few, can be utilized to form substrate or SAW die 110, depending upon design considerations. Note that although examples herein refer to a SAW device, it can be appreciated that SAW sensor 300 can be implemented in the context of acoustic plate mode (APM) components, rather than SAW components, depending, of courses upon design considerations. Additionally, SAW or APM sensor 300 can be implemented as a resonator type device or a delay line type device. The acoustic wave flow sensor could be implemented as a surface acoustic wave (SAW), shear horizontal surface acoustic wave (SH-SAW), acoustic plate mode (APM), shear horizontal acoustic plate mode (SH-APM), surface transverse wave (STW) or flexural plate wave (FPW) device in different embodiments.

The SAW IDT 108, 109 can be composed of one or more groups of interpenetrating metallic electrodes fabricated photo lithographically on the surface of the SAW die 110, which may be formed, for example as a piezoelectric substrate. SAW IDT 108, 109 can be formed from materials, which are generally divided into three groups. First, SAW IDT 108, 109 can be formed from a metal group material (e.g., Al, Pt, Au, Rh, Ir Cu, Ti, W, Cr, or Ni). Second, SAW IDT 108, 109 can be formed from alloys such as NiCr or CuAl. Third, SAW IDT 108, 109 can be formed from metal-nonmetal compounds (e.g., ceramic electrodes based on TiN, $CoSi_2$, or WC).

In the configuration of FIG. 2, system 100 is shown with fluid flowing within the central portion 104 of tube 102, as indicated by arrow 202. The SAW sensor 300 is again illustrated in FIG. 2. Since the etched diaphragm 106 is formed parallel to the main axis of the tube, the fluid flow 202 flows parallel to the etched diaphragm 106 surface, as shown in FIG. 2. In the configuration of FIG. 2, however, the SAW etched diaphragm 106 is now shown as under stress due to the presence of fluid flow, as indicated by arrow 202. The stress on the diaphragm 106 is created by the fluid flow 202. This creates a low pressure pulling force on the diaphragm 106 as indicated by arrow 204 in FIG. 2. The actual configuration of SAW sensor 300 is shown in greater detail in FIG. 3, including the SAW die 110, the SAW etched diaphragm 106, and the SAW IDT 108.

It can be appreciated from FIGS. 1–3, that system 300 involves the measurement of fluid flow induced stress on the SAW device or sensor 300. SAW sensor 300 can be configured, for example, with only one SAW component composed of SAW etched diaphragm 106 and SAW IDT 108 on the SAW die (i.e., chip) 110. In SAW sensor 300, mechanical stress/strain affects both the propagation length and wave velocity. Changes in frequency and/or phase correlate with the strain/stress. Stress/strain is therefore concentrated in the SAW etched diaphragm 106, so that the etched SAW chip 110 possesses a higher strain/stress sensitivity.

Figure 4:
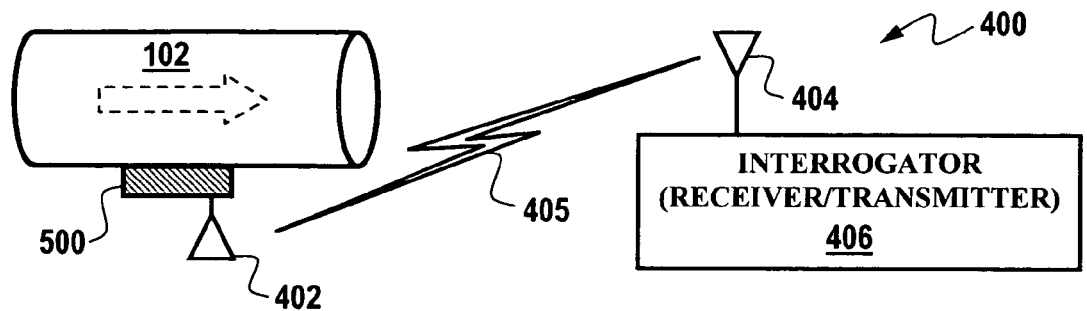
FIG. 4 illustrates a diagram of a flow sensor system that can be implemented in accordance with an alternative embodiment.
Figure 5:
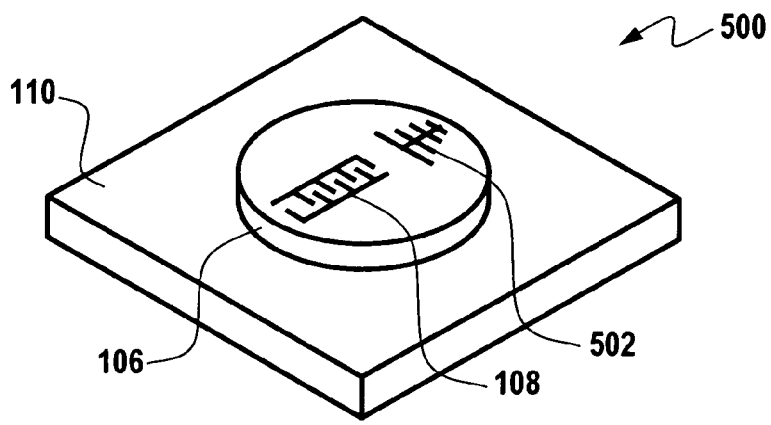
FIG. 5 illustrates a perspective view of a SAW flow sensor, which can be adapted for use with the system depicted in FIG. 4.

FIG. 4 illustrates a diagram of a flow sensor system 400 that can be implemented in accordance with an alternative embodiment. FIG. 5 illustrates a perspective view of a SAW flow sensor 500, which can be adapted for use with the system 400 depicted in FIG. 4. Note that in FIGS. 1–5, identical or similar parts or elements are generally indicated by identical reference numerals. Thus, system 400 incorporates the use of a SAW flow sensor 500 that is similar to flow sensor 300 depicted in FIGS. 1–3. SAW flow sensor 500 is shown in greater detail in FIG. 5, including the SAW IDT 108 formed on the etched SAW diaphragm 106 in association with antenna 502 upon substrate or SAW die 110.

The difference between SAW sensor 300 and SAW sensor 500 is that SAW sensor 500 is configured to be equipped with an antenna 402 that transmits signals to and from an interrogator unit 406 that functions as a transmitter/receiver for wirelessly transmitting and receiving signals to and form SAW sensor 300. The wireless transmission of data is generally indicated in FIG. 4 by arrow 405. Interrogator 404 is also equipped with an antenna for transmitting and receiving data wirelessly. SAW flow sensor 500, of course, functions similar to the SAW flow sensor 300 depicted in FIGS. 1–3.

Figure 6:
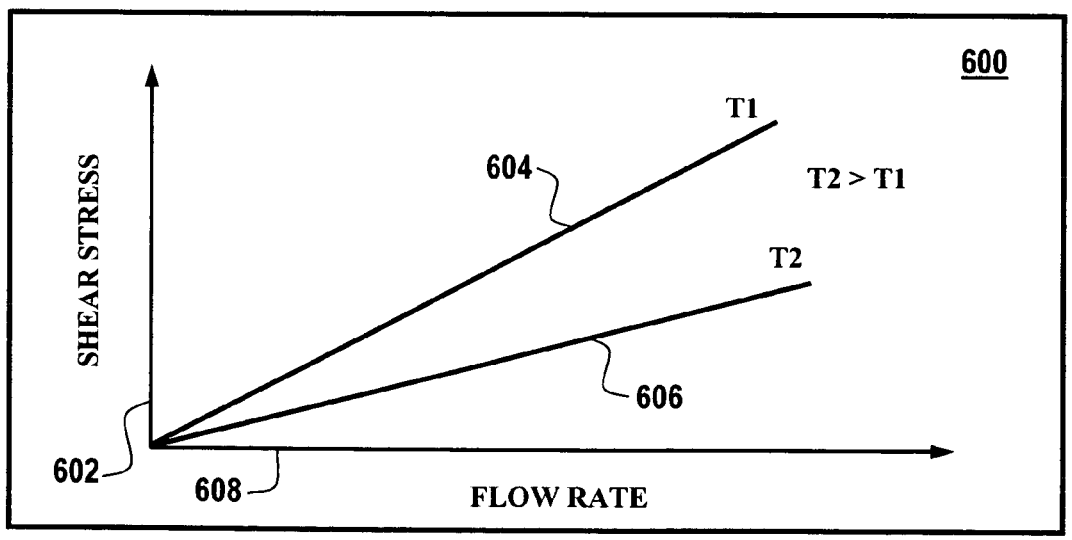
FIG. 6 illustrates a graph of flow rate versus shear force and temperature in accordance with one or more embodiments.

FIG. 6 illustrates a graph 600 of flow rate versus shear force and temperature in accordance with one or more embodiments. In the configuration of graph 600, an Y-axis 602 is depicted representing shear stress data, while a X-axis 608 is indicated representative of flow rate data. A line 604 can therefore be plotted associated with a temperature T1, while a line 606 can be plotted associated with a temperature T2. As indicated in graph 600, temperature T2 is greater than temperature T1. Graph 600 simply demonstrates why a temperature reading might be required with respect to the sensor embodiments disclosed herein, because shear stress changes with flow rate and temperature.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An acoustic wave flow sensor, comprising;
   a sensor substrate;
   an acoustic wave diaphragm etched upon said sensor substrate, wherein a mechanical stress or strain is concentrated in said acoustic wave diaphragm; and
   at least one interdigital transducer configured upon said acoustic wave diaphragm, wherein said sensor substrate, said acoustic wave diaphragm and said at least one interdigital transducer form an acoustic wave flow sensor, such that when said at least one interdigital transducer and said acoustic wave diaphragm are exposed to a fluid in flow, wherein said fluid flow is parallel to said acoustic wave diaphragm, said fluid in flow causes said acoustic wave diaphragm to experience a pulling force, wherein said pulling force pulls said acoustic wave diaphragm inward towards said fluid in flow creating a change in said mechanical stress or strain resulting in a detectable frequency change in order to provide an indication of said fluid in flow.

2. The sensor of claim 1 wherein said fluid in flow causes said acoustic wave diaphragm to experience a change in said mechanical stress or strain resulting in a detectable phase change in order to provide an indication of said fluid in flow.

3. The sensor of claim 1 wherein said sensor substrate comprises a piezoelectric material.

4. The sensor of claim 3 wherein said piezoelectric material comprises at least one of the following types of materials: quartz, lithium niobate ($LiNbO_3$), lithium tantalite ($LiTaO_3$), $Li_2B_4O_7$, $GaPO_4$, langasite ($La_3Ga_5SiO_{14}$), ZnO, and an epitaxially grown nitride.

5. The sensor of claim 1 wherein said at least one interdigital transducer is formed from a material comprising at least one of the following types of materials: a metal group material, an alloy, or a metal-nonmetal compounds.

6. The sensor of claim 1 further comprising an antenna configured upon said acoustic wave diaphragm in association with said at least one interdigital transducer.

7. The sensor of claim 6 further comprising an interrogator unit equipped with an antenna for transmitting interrogation signals to said acoustic wave flow sensor.

8. The sensor of claim 1 wherein said acoustic wave diaphragm comprises a surface acoustic wave (SAW) device.

9. The sensor of claim 8 wherein said SAW devices comprises an etched cavity parallel to said fluid in flow.

10. The sensor of claim 1 wherein said acoustic wave diaphragm comprises a bulk acoustic wave (BAW) device wherein said acoustic wave flow sensor is a surface acoustic wave (SAW), shear horizontal surface acoustic wave (SH-SAW), acoustic plate mode (APM), shear horizontal acoustic plate mode (SH-APM), surface transverse wave (STW) or flexural plate wave (FPW) device.

11. The sensor of claim 1 wherein said sensor substrate comprises a swept quartz substrate.

12. The sensor of claim 1 wherein said sensor substrate is configured form a double-polished SAW quartz wafer.

13. An acoustic wave flow sensor, comprising;
a sensor substrate comprising a piezoelectric material;
an acoustic wave diaphragm etched upon said sensor substrate, wherein a mechanical stress or strain is concentrated in said acoustic wave diaphragm; and
at least one interdigital transducer configured upon said acoustic wave diaphragm, wherein said sensor substrate, said acoustic wave diaphragm and said at least one interdigital transducer form an acoustic wave flow sensor, wherein when said at least one interdigital transducer and said acoustic wave diaphragm are exposed to a fluid in flow, wherein said acoustic wave diaphragm is parallel to said fluid in flow, said fluid in flow causes said acoustic wave diaphragm to experience a pulling force, wherein said pulling force pulls said acoustic wave diaphragm inward towards said fluid in flow creating a change in said mechanical stress or strain resulting in a detectable frequency or phase change in order to provide an indication of said fluid in flow.

14. The system of claim 13 wherein said acoustic wave flow sensor is adapted for use in a feedback loop of an oscillator in a wired implementation of said acoustic wave flowing sensing system.

15. The system of claim 13 wherein said acoustic wave flow sensor is utilized to detect temperature.

16. An acoustic wave flow sensing method, comprising;
providing a sensor substrate comprising a piezoelectric material;
etching an acoustic wave diaphragm upon said sensor substrate, wherein a mechanical stress or strain is concentrated in said acoustic wave diaphragm; and
configuring at least one interdigital transducer upon said acoustic wave diaphragm, wherein said sensor substrate, said acoustic wave diaphragm and said at least one interdigital transducer form an acoustic wave flow sensor,
exposing said at least one interdigital transducer and said acoustic wave diaphragm to a fluid in flow, wherein said acoustic wave diaphragm is parallel to said fluid in flow, wherein said fluid in flow causes said acoustic wave diaphragm to experience a pulling force, wherein said pulling force pulls said acoustic wave diaphragm inward towards said fluid in flow creating a change in said mechanical stress or strain resulting in a detectable frequency change in order to provide an indication of said fluid in flow.

17. The method of claim 16 wherein said fluid in flow causes said acoustic wave diaphragm to experience a change in said mechanical stress or strain resulting in a detectable phase change in order to provide an indication of said fluid in flow.

18. The method of claim 16 further comprising configuring said sensor substrate to comprise a swept quartz substrate.

19. The method of claim 16 further comprising configuring said sensor has a textured surface facing the liquid.

20. The method of claim 16 said indication of said fluid in flow is based on a flow induced shear stress measurement.

21. The method of claim 16 wherein the said acoustic wave sensor comprises an acoustic wave temperature sensor.

* * * * *